Patented Dec. 9, 1947

2,432,470

UNITED STATES PATENT OFFICE 2,432,470

PREPARATION OF CHLORMALEIC ANHYDRIDE

Albert M. Clifford, Stow, Ohio, assignor to Wingfoot Corporation, Akron, Ohio, a corporation of Delaware No Drawing. Application June 13, 1945, Serial No. 599,301

2 Claims. (Cl. 260—342.6)

This invention relates to the production of monochloro-maleic anhydride from maleic anhydride. More specifically, the invention relates to the dehydrochlorination of dichloro succinic anhydride prepared by the chlorination of maleic anhydride.

The preparation of monochloro-maleic anhydride by the chlorination and subsequent dehydrochlorination of maleic anhydride involves the following reactions:

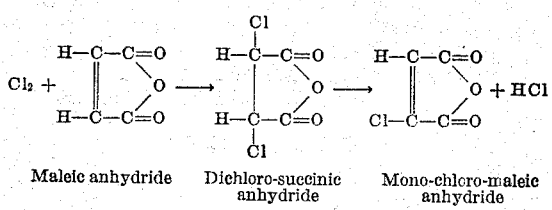

Maleic anhydride   Dichloro-succinic anhydride   Mono-chloro-maleic anhydride

The first reaction generally proceeds at lower temperatures than does the second reaction and, accordingly, at higher temperatures the chlorination and dehydrochlorination may take place simultaneously, thereby resulting in the formation of a mixed product, which is difficult to separate into its components. At elevated temperatures the desired product, monochloro-maleic anhydride, may become further chlorinated to form trichloro succinic anhydride which may then lose hydrogen chloride to form dichlor-maleic anhydride. Thus it will be apparent that, if monochloro-maleic anhydride is desired, very careful controls are required to prevent the formation of other products and to insure a high yield of the desired mono-chloro-maleic anhydride. The purpose of this invention is to provide a method of preparing mono-chloro-maleic anhydride which results in substantially quantitative yields.

In application Serial No. 456,087, filed August 25, 1942, by Albert M. Clifford and John R. Long, there is described and claimed a method of preparing substantial yields of the intermediate product, dichloro-succinic anhydride, by chlorination of maleic anhydride at temperatures in excess of 140° C., at which temperature the reaction rate is practicable, but without the dehydrochlorination, which usually takes place at such temperatures, to form a mixture of monochloro-maleic anhydride and dichloro-succinic anhydride.

Attempts have been made to conduct the chlorination and dehydrochlorination simultaneously in the presence of catalysts at temperatures below those required for the further chlorination of the mono-chloro-maleic anhydride. These methods are described and claimed in application Serial No. 456,090, filed August 25, 1942, by Charles R. Milone. Although the one-step process has many advantages over the two-step process, the latter also has its advantages. In either case, however, the selection of proper catalysts for the dehydrochlorination is of major importance. Thus, in application Serial No. 456,090 (identified above) and application Serial No. 479,148, filed March 13, 1943, by John R. Long and Clyde E. Gleim, there are described and claimed catalytic methods for dehydrochlorinating dichloro-succinic anhydride. The former application utilizes alkaline earth metal halides, acyl peroxides, and anhydrides of monocarboxylic acids, while the latter case utilizes secondary or tertiary amines.

The dehydrochlorination of dichloro-succinic anhydride in accordance with this invention involves homogeneous catalysis in the presence of any iron salt. The salts of iron which are preferred for reasons of economy are the chlorides and sulfates, either ferric or ferrous salts being used. The use of iron salts as catalysts results in high yields of pure mono-chloro-maleic anhydride, while the use of metallic iron, known to the art, produces tarry masses which contaminate the product, foul the catalyst, and lower the yield of the desired product.

The preferred process uses maleic anhydride as the raw material. The first step is to chlorinate the maleic anhydride by the reaction of gaseous chlorine at temperatures in excess of 140° C., which promote a reasonably rapid rate of reaction, and at a pressure of 10 pounds per square inch gauge, in accordance with the above-identified application Serial No. 456,087. If desired, the dichloro-succinic anhydride thus prepared may be purified by distillation at reduced pressures, for example at 2 to 10 mm. total pressure. The thus purified dichlor-succinic anhydride may then be treated in accordance with this invention by adding a small proportion of an iron salt, for example iron chloride or iron sulfate, preferably from 0.5 to 5.0 percent by weight, and heating the resulting mixture at a temperature in excess of 140° C., which causes the evolution of gaseous hydrogen chloride and produces substantial yields of mono-chloro-maleic anhydride. If reasonable precautions have been taken to purify the intermediate product, dichloro-succinic anhydride, there will be very few impurities in the final product and a substantially quantitative yield will be obtained.

Further details of the invention are set forth with respect to the following specific examples:

Example 1

In a glass reactor heated by an oil bath and provided with a stirrer, a fritted glass chlorine inlet and a packed column outlet, 17.3 pounds (80 moles) maleic anhydride were melted and mixed with 0.5 percent of iron powder. A stream of gaseous chlorine was passed into the vessel for 9 hours at 130–140° C., after which time the temperature was raised to the reflux temperature of 185–190° C. till substantially all HCl had escaped and then the product was distilled at 110–115° C. at a pressure of 40 mm. A yield of 48 percent of mono-chloro-maleic anhydride was obtained. A considerable quantity of a non-distillable black, tarry substance was found associated with the iron residues in the reaction vessel.

Example 2

Utilizing the apparatus of Example 1, 17.3 pounds maleic anhydride was heated to 140–150° C. with 1.0 percent clean powdered iron. Gaseous chlorine was conducted into the liquid for 23 hours to a weight increase of 8.00 pounds, after which the reaction mass was heated slowly to incipient reflux (180–190° C.) until the main portion of HCl had been evolved, and finally distilled at atmospheric pressure, yielding 13.92 pounds, equivalent to 60 percent yield mono-chloro-maleic anhydride with a boiling range of 190–195° C. Again, there remained a considerable amount of tarry residue.

Example 3

In an experiment identical with Example 2, except using 0.26 percent powdered iron, the amount of tarry material was so great that the reaction product was very viscous and could not be distilled.

Example 4

The experiment of Example 1 was repeated except that 2.5 percent of anhydrous iron chloride was used in place of the powdered iron, and chlorination was conducted at 105–110° C. A yield of 22.41 pounds or 96 percent of distilled mono-chloro-maleic anhydride was obtained, B. P. 103–105° C. @ 38 mm. with a density of $1.5469^{28}/_{15}$.

Example 5

This experiment was identical with Example 2 except that 2.5 percent anhydrous ferric chloride was employed. Chlorination was conducted at 140–150° C. for 23 hours and to a weight increase of 7.82 pounds. The reaction product at this point was gradually heated up to incipient boiling and finally distilled. The fraction collected at 190–195° C., amounted to 21.42 pounds, representing a 92 percent of theoretical yield.

This application is a continuation-in-part of application Serial No. 456,086, filed August 25, 1942.

Although the invention has been described with respect to specific improvements thereof, it is not intended that the details set forth shall be construed as limitations upon the scope of the invention except to the extent included in the following claims.

I claim:

1. The method of converting dichloro-succinic anhydride to mono-chloro-maleic anhydride which comprises heating the dichloro-succinic anhydride to a temperature of at least 140° C. in the presence of ferric chloride.

2. The method of converting dichlorosuccinic anhydride to monochloromaleic anhydride which comprises heating the dichlorosuccinic anhydride to a temperature of at least 140° C. in the presence of a catalyst of the group consisting of the chlorides and sulfates of iron.

ALBERT M. CLIFFORD.

REFERENCES CITED

The following references are of record in the file of this patent:

UNITED STATES PATENTS

| Number | Name | Date |
|---|---|---|
| 2,028,383 | Dvornikoff | Jan. 21, 1936 |

OTHER REFERENCES

Chemical Abstracts, vol. 31, page 7447, citing Russian Patent 43,419 (1935).

U. S. Pharmacopoeia, XI, page 508.